United States Patent
Van Keulen

(10) Patent No.: US 6,207,307 B1
(45) Date of Patent: Mar. 27, 2001

(54) CARBON MONOXIDE REMOVAL FROM A REFORMATE GAS

(75) Inventor: Arjan Nicolaas Johan Van Keulen, Reading (GB)

(73) Assignee: Johnson Matthey Public Limited Company, London (GB)

(*) Notice: Subject to any disclaimer, the term of this patent is extended or adjusted under 35 U.S.C. 154(b) by 0 days.

(21) Appl. No.: 09/147,973

(22) PCT Filed: Sep. 9, 1997

(86) PCT No.: PCT/GB97/02425

§ 371 Date: Mar. 24, 1999

§ 102(e) Date: Mar. 24, 1999

(87) PCT Pub. No.: WO98/13294

PCT Pub. Date: Apr. 2, 1998

(30) Foreign Application Priority Data

Sep. 28, 1996 (GB) .................................................. 9620287

(51) Int. Cl.⁷ .............................. H01M 8/06; C07C 1/04
(52) U.S. Cl. .............................. 429/19; 423/247; 585/733
(58) Field of Search .......................... 423/247; 585/733; 429/19, 20

(56) References Cited

U.S. PATENT DOCUMENTS

| 3,615,164 | 10/1971 | Baker et al. |
|---|---|---|
| 4,569,890 | * 2/1986 | Barthel ................................ 429/19 X |
| 4,583,994 | * 4/1986 | Frost et al. ........................ 585/733 X |
| 4,618,728 | * 10/1986 | Herrington et al. ............... 585/733 X |
| 5,071,719 | * 12/1991 | Rostrup-Nielsen et al. ........... 429/19 |
| 5,248,566 | * 9/1993 | Kumar et al. ........................... 429/19 |
| 5,496,530 | * 3/1996 | Vannby et al. .................... 585/733 X |
| 5,612,012 | * 3/1997 | Soma et al. ....................... 423/247 X |

FOREIGN PATENT DOCUMENTS

| 43 34 983 | 4/1995 | (DE) . |
|---|---|---|
| 0 533 232 | 3/1993 | (EP) . |
| 2 132 183 | 7/1984 | (GB) . |
| 2 193 506 | 2/1988 | (GB) . |

OTHER PUBLICATIONS

K.N. Irisova et al., "Selection of catalysts for removal of carbon oxides from hydrogen-containing gases," *Chemical Abstracts*, vol. 111, No. 16, Oct. 16, 1989, p. 159.

International Search Report for International Application No. GB97/02425 dated Dec. 2, 1997.

* cited by examiner

*Primary Examiner*—Stephen Kalafut
(74) *Attorney, Agent, or Firm*—Ratner & Prestia

(57) ABSTRACT

A process for removing carbon dioxide from a gas stream containing hydrogen, carbon monoxide and carbon dioxide comprising subjecting the gas stream to a first stage high-temperature selective catalytic methanation to lower the carbon monoxide concentration in the gas but not below a concentration which allows carbon dioxide methanation to take place, followed by a second stage low selective catalytic methanation to lower the residual carbon monoxide in the gas stream to a concentration of below 40 ppm. The high temperature methanation is suitably carried out at a temperature of between 250° C. and 350° C., and the low temperature methanation is suitably carried out at a temperature below 270° C.

15 Claims, No Drawings

CARBON MONOXIDE REMOVAL FROM A REFORMATE GAS

This application is the U.S. national-phase application of PCT International Application No. PCT/GB97/02425.

This invention relates to a method of purifying gas streams containing hydrogen, carbon monoxide and carbon dioxide and more particularly relates to a method for the removal of carbon monoxide from reformate gas mixtures.

Fuel cell systems for vehicular application consist of either a tank of compressed gas that supplies a fuel cell with pure hydrogen, or an on-board hydrogen production unit followed by a hydrogen clean-up unit and a fuel cell. For the hydrogen production unit there are three main options, namely, steam reforming, partial oxidation or a combination of steam reforming and partial oxidation. The reformate gas mixture produced by such reforming of organic fuels contains hydrogen, carbon monoxide and carbon dioxide (and nitrogen when the reformer functions by partial oxidation using air). The concentration of carbon monoxide in the reformate gas mixture depends on such factors as the composition of the reactant feed, the temperature in the catalyst bed and the type of reformer being used. For example, when methanol is the fuel, carbon monoxide concentrations within the range 0.1 to 10 vol % can be obtained. These concentrations are too high for the reformate to be supplied directly to a fuel cell, the anode catalyst of which can be poisoned by carbon monoxide levels as low as 40 ppm.

The catalytic removal of carbon monoxide from a reformate is currently achieved by a number of single-step techniques. These include (i) the selective oxidation of the carbon monoxide to carbon dioxide; (ii) the reduction of the carbon monoxide with water vapour (water-gas shift) and (iii) the selective reduction of the carbon monoxide to methane (methanation).

U.S. Pat. No. 3,615,164 discloses a process for removing carbon monoxide from a gas stream containing hydrogen, carbon monoxide and carbon dioxide which comprises subjecting the gas stream to a selective methanation at a temperature between 100 and 200° C. using a catalyst of ruthenium or rhodium on alumina. The conditions are chosen so that no undesirable carbon dioxide methanation occurs.

German Patent Application DE-A-4334983 discloses a two-step process for removing carbon monoxide from hydrogen comprising a carbon monoxide oxidation followed by a methanation.

The present invention relates to the removal of carbon monoxide from gas streams containing hydrogen, carbon monoxide and carbon dioxide by an improved selective catalytic methanation process.

Accordingly, the present invention provides a process for removing carbon monoxide from a gas stream containing hydrogen, carbon monoxide and carbon dioxide which comprises subjecting the gas stream to a first stage selective catalytic methanation at a temperature at which the carbon monoxide concentration in the gas stream does not fall below 0.1 vol % in order to prevent carbon dioxide methanation taking place followed by a second stage selective catalytic methanation conducted at a temperature at which the residual carbon monoxide concentration in the gas stream is lowered to below 40 ppm with no carbon dioxide methanation taking place, the first stage catalytic methanation being conducted at a higher temperature than the second stage catalytic methanation.

Preferably, the first stage methanation is carried out at a temperature between 250° C. and 350° C., suitably 260° C. to 300° C.

Preferably, the second stage methanation is carried out at a temperature below 270° C., suitably 200° C. to 260° C.

Further preferably, the first stage methanation reduces the concentration of carbon monoxide to between 1 and 0.1 vol %, suitably around 0.8 vol %.

Further preferably, the second stage methanation reduces the concentration of carbon monoxide to below 10 ppm.

The first stage selective catalytic methanation may be carried out in a single step.

Alternatively, the first stage selective catalytic methanation may be carried out in two or more steps.

In one embodiment of the invention the gas stream to be purified is a reformate gas mixture.

Suitable methanation catalysts are supported noble metal catalysts, eg rhodium alumina catalysts.

Another aspect of the present invention is a hydrogen clean-up unit which operates in accordance with the process as above described.

Yet another aspect of the present invention is a fuel cell system for vehicular application comprising (a) an on-board hydrogen production unit; (b) a hydrogen clean-up unit and (c) a fuel cell, wherein the hydrogen clean-up unit operates in accordance with the process above described.

The present invention is based on the phenomenon that carbon monoxide acts as an inhibitor for the methanation of carbon dioxide. This is illustrated by the series of experiments depicted in Table 1 below.

TABLE 1

The results of the CO and $CO_2$ methanation experiments.

| Temperature | CO methanation conversion | | | | $CO_2$ methanation conversion | |
|---|---|---|---|---|---|---|
| | CO (%) | $H_2$ (%) | $CO_2$ (%) | [CO] (vol %) | $H_2$ (%) | $CO_2$ (%) |
| 185–195 | 5 | 2 | 0 | 2.90 | 11 | 6 |
| 215–225 | 30 | 6 | 0 | 2.15 | 28 | 16 |
| 225–235 | 57 | 11 | 0 | 1.34 | 45 | 25 |
| 250–260 | 100* | 66* | 26* | 0.00 | 70 | 39 |

*a light-off occurred and this sustained itself.

The results shown in the left-hand side of Table 1 show that increasing the temperature leads to increased carbon monoxide conversion. For example, at temperatures in the range 225° C. to 235° C., a carbon monoxide conversion of 57% was achieved, which is over ten times the conversion which occurs in the temperature range 185° C. to 195° C. However, above 240° C., a "light-off" of the reaction occurred with the catalyst bed temperatures rising to above 300° C. During this "light-off", not only all the carbon monoxide but large quantities of hydrogen and carbon dioxide were converted as well. The carbon dioxide methanation provides most of the heat for the "light-off".

It was observed that the "light-off" occurred only after all the carbon monoxide was converted, which indicates that the carbon monoxide inhibits the carbon dioxide methanation. To check this, similar experiments were conducted, but with no carbon monoxide present. The results of the carbon dioxide methanations are shown in the right-hand side of Table 1. These results show that at all temperatures examined, a carbon dioxide conversion took place. This is in contrast to the carbon monoxide methanation experiments, where carbon dioxide conversion was observed only after all the carbon monoxide had been converted again illustrating that carbon monoxide effectively inhibits the carbon dioxide methanation.

The fact that carbon monoxide inhibits the carbon dioxide methanation can be used to advantage. Table 1 shows that so long as no full carbon monoxide conversion is achieved, it is possible to go to higher temperatures and suffer no extra hydrogen losses due to carbon dioxide methanation. It follows from the above that a two-stage carbon monoxide clean-up can be used to remove all the carbon monoxide from the hydrogen gas stream. The first stage is a high temperature methanation in which the carbon monoxide concentration is lowered from 3 vol % or higher to around 1 to 0.1 vol %, preferably around 0.8 vol %. The second stage is a low temperature methanation in which the residual carbon monoxide is lowered to less than 10 ppm.

An embodiment invention will now be described, by way of example only.

EXAMPLE

The two-stage methanation process was carried out using a synthetic reformate and a 50 ml catalyst bed and the results are shown in Table 2 below.

TABLE 2

| Temperature | Conversions | | | [CO] out (vol %) |
|---|---|---|---|---|
| | CO (%) | $H_2$ (%) | $CO_2$ (%) | |
| Stage 1 ([CO]$_{in}$ 3.0 vol %) | | | | |
| 260–270 | 73.9 | 13.4 | 0 | 0.85 |
| Stage 2 ([CO]$_{in}$ 0.85 vol %) | | | | |
| 230–255 | 99.5 | 7.73 | 1.5 | 10 ppm |

The conditions under which the experiments depicted in Table 1 and Table 2 were conducted are shown in Table 3 below.

TABLE 3

| Experiment | Catalyst ((2%) Rh/Al$_2$O$_3$) | | Flow | Inlet Concentrations | | | | GHSV (h$^{-1}$) |
|---|---|---|---|---|---|---|---|---|
| | weight (gram) | volume (ml) | total (ml/min) | $H_2$ (vol %) | $N_2$ (vol %) | $CO_2$ (vol %) | CO (vol %) | |
| CO methanation | 23.3 | 46 | 200 | 49.1 | 28.6 | 19.3 | 3.05 | 261 |
| CO$_2$ methanation | 23.3 | 46 | 194 | 50.6 | 29.5 | 19.9 | 0.00 | 253 |
| Two-stage concept | 23.3 | 46 | 1000 | 49.1 | 28.6 | 19.3 | 3.6 | 1300 |

Table 2 shows that with the two-stage methanation concept of the invention, it is possible to remove all the carbon monoxide from a reformate gas stream. When in the first high temperature methanation stage, the carbon monoxide level is lowered to 0.85 vol %, no carbon dioxide is converted, thus keeping the hydrogen losses to a minimum. In the second low temperature methanation stage, the residual carbon monoxide can be removed to give a carbon monoxide concentration of less than 10 ppm with minimal carbon dioxide conversion.

In the Example of the invention shown in Table 2, the first-stage high temperature methanation was conducted as a single step. However, if the hydrogen gas stream flow rates are very high and/or the inlet carbon monoxide concentrations are very high, the first stage high temperature methanation can be carried out in two or more steps.

The two-stage methanation process of the present invention has the following advantages:

(i) the high temperature stage ensures a fast removal rate of carbon monoxide;

(ii) the low temperature stage ensures very little methanation of carbon dioxide which keeps hydrogen losses to a minimum;

(iii) much less catalyst is required than in single-stage carbon monoxide methanations;

(iv) the process enables a flexible carbon monoxide clean-up unit capable of lowering carbon monoxide concentrations to below 10 ppm from high velocity feed streams containing between 0.1 and 10 vol % carbon monoxide; and (v) the process enables a very compact carbon monoxide clean-up unit, particularly for vehicular application.

What is claimed is:

1. A process for removing carbon monoxide from a gas stream containing hydrogen, carbon monoxide and carbon dioxide which comprises subjecting the gas stream to a first stage selective catalytic methanation at a first higher temperature and continuing said first stage methanation until the carbon monoxide concentration in the gas stream is reduced to a concentration of 0.1–1 vol %, in order to prevent carbon dioxide methanation taking place, followed by a second stage selective catalytic methanation conducted at a second lower temperature at which the residual carbon monoxide concentration in the gas stream is lowered to below 40 ppm with no carbon dioxide methanation taking place.

2. A process in accordance with claim 1, wherein the first stage methanation is carried out at a temperature between 250° C. and 350° C.

3. A process in accordance with claim 2, wherein the first stage methanation is carried out at a temperature between 260° C. and 300° C.

4. A process in accordance with claim 1, wherein the second stage methanation is carried out at a temperature of below 270° C.

5. A process in accordance with claim 4, wherein the second stage methanation is carried out at a temperature between 200° C. and 260° C.

6. A process in accordance with claim 1, wherein the first stage methanation reduces the concentration of carbon monoxide to between 1 and 0.1 vol %.

7. A process in accordance with claim 6, wherein the first stage methanation reduces the concentration of carbon monoxide to around 0.8 vol %.

8. A process in accordance with claim 1, wherein the second stage methanation reduces the concentration of carbon monoxide to below 10 ppm.

9. A process in accordance with claim 1, wherein the first stage methanation is conducted in a single step.

10. A process in accordance with claim 1, wherein the first stage methanation is conducted in two or more steps.

11. A process in accordance with claim 1, wherein the gas stream to be purified is a reformate gas mixture.

12. A process in accordance with claim 1, wherein the selective methanation catalyst used is a supported noble metal catalyst.

13. A process in accordance with claim 12, wherein the catalyst is a rhodium alumina catalyst.

14. A hydrogen clean-up unit which operates in accordance with the process claimed in claim 1.

15. A fuel cell system for vehicular application comprising (a) an on-board hydrogen production unit; (b) a hydrogen clean-up unit and (c) a fuel cell, wherein the hydrogen clean-up unit operates in accordance with the process claimed in claim 1.

* * * * *